United States Patent [19]
Zoroufy

[11] Patent Number: 5,351,646
[45] Date of Patent: Oct. 4, 1994

[54] PORTABLE HAIR COLLECTING FURNITURE DEVICE FOR CATS AND CARRIER

[76] Inventor: Aboolhassan Zoroufy, 3592 Mathias Way, Verona, Wis. 53593

[21] Appl. No.: 169,329

[22] Filed: Dec. 20, 1993

[51] Int. Cl.⁵ .............................................. A01K 1/02
[52] U.S. Cl. ...................................................... 119/19
[58] Field of Search .............................. 119/15, 19, 83

[56] References Cited

U.S. PATENT DOCUMENTS

| | | | |
|---|---|---|---|
| D. 224,686 | 8/1972 | Michlap et al. | |
| D. 254,813 | 4/1980 | Kossar | |
| 1,582,144 | 4/1926 | Pflaum | |
| 2,538,778 | 1/1951 | Halpin | |
| 2,865,329 | 12/1958 | Elliott | 119/83 |
| 2,894,487 | 7/1959 | Goldson | |
| 2,976,841 | 3/1961 | Scheffer | 119/83 |
| 3,156,213 | 11/1964 | Patten | |
| 3,481,311 | 12/1969 | Schluttig | |
| 3,482,548 | 12/1969 | Burns | |
| 3,509,855 | 5/1970 | Priddy, Jr. | |
| 3,850,144 | 11/1974 | Springer et al. | |
| 3,934,552 | 1/1976 | Kulka | 119/19 |
| 4,220,119 | 9/1980 | Albright | |
| 4,301,766 | 11/1981 | Piccone | |
| 4,347,807 | 9/1982 | Reich | |
| 4,484,540 | 11/1984 | Yamamoto | |
| 4,576,116 | 3/1986 | Binkert | 119/19 |
| 4,644,902 | 2/1987 | Doyle | |
| 4,729,343 | 3/1988 | Evans | 119/15 X |
| 4,781,147 | 11/1988 | Delino, Jr. | |
| 4,803,951 | 2/1989 | Davis | |
| 4,852,520 | 8/1989 | Goetz | |
| 4,907,540 | 3/1990 | Reynolds | |
| 4,938,169 | 7/1990 | Barmakian | 119/15 X |
| 4,977,857 | 12/1990 | Slawinski | |
| 4,996,946 | 3/1991 | Olson | |
| 5,038,716 | 8/1991 | Olson | |

FOREIGN PATENT DOCUMENTS

| | | |
|---|---|---|
| 2354727 | 6/1976 | France |
| 2476461 | 2/1980 | France |

OTHER PUBLICATIONS

Lillian Vernon Catalog, vol. 304, printed 1993 (probably before Jun. 1, 1993), p. 51.
Zoroufy, Feline Resort TM Cat Playland, Feb. 1992.
"Kitt'n Gym", Cal-Pet Products 1986.
R. C. Steele, Wholesale Dog Equipment and Kennel Supplies, Spring 1993, pp. 4, 16, 58, 60.
1994 Jeffers Pet Catalog, Nov. 17, 1993, p. 60.

*Primary Examiner*—Gene Mancene
*Assistant Examiner*—Thomas Price
*Attorney, Agent, or Firm*—Stroud, Stroud, Willink, Thompson & Howard

[57] ABSTRACT

A portable hair collecting furniture device for cats includes an open ended rigid housing having a C-shaped partially cylindrical top portion and a planar floor portion. A first material with a plurality of raised rubberized protuberances on its exterior surface is located upon the interior of the device with the protuberances oriented toward the interior of the device. A compressible second material having a plurality of compressible parallel ribs overlies the floor. A flexible carrier is used in conjunction with the device includes a carrier top portion joined to a carrier floor portion with two housing ends opposite one another and joined to the floor portion. One of the ends is releasably closed with a zipper and has a perforate panel. A pair of handles affixed to the top portion. A safety strap is centrally positioned on the exterior surface of the top portion of the carrier. A kit utilizing the cat carrier and the cat furniture device is also provided.

24 Claims, 8 Drawing Sheets

PORTABLE HAIR COLLECTING FURNITURE DEVICE FOR CATS AND CARRIER

FIELD OF THE INVENTION

This invention relates to portable furniture devices for cats and to carriers for the portable furniture devices in general, and for those furniture devices that perform a grooming function and to those carriers which, when used in conjunction with the portable furniture device, provide for safety in moving vehicle travel in particular.

BACKGROUND OF THE INVENTION

Cats, though well-loved by a considerable proportion of the population, can present problems to pet owners. One of these problems is associated with the cat fur. Cat fur may cause an allergic reaction or irritation of the pet owner's sinuses. Cats without hair have been bred but without hair, cats are less appealing both visually and tactilely, their soft, silky fur being part of their allure. For some breeds of cats, such as Persians, periodic vacuum cleaning provides a satisfactory method of reducing their distribution of unwanted cat hairs. Many cats, however, will not tolerate the noise and disturbances of vacuum cleaning.

A second problem is associated with the need of a cat to constantly sharpen its claws by dragging them over roughened surfaces, all too often the owner's furniture and drapes. Numerous solutions have been proposed and tried to eliminate these less than desirable feline characteristics. Surgical procedures have been perfected for removing the front claws of a cat. However, this reduces their efficiency as mouse catchers and restricts the cat to a strictly indoor life, as the cat is no longer able to defend itself or escape danger by climbing trees.

Cat posts and furniture devices utilizing carpeting materials and/or rope have been developed which encourage the cat to exercise or sharpen its claws on a piece of furniture especially purchased for that purpose. However, such cat furniture devices do not address the problem of cat hair.

Still other cat beds, including soft, flexible cylindrical tunnel-like pet beds having a layer of urethane foam, flexible cloth sack-like devices and flexible open ended cup-like beds are strictly resting places for cats and address neither problem.

One solution for removing excess hair from cats and other animals has involved furniture devices which extend radially directed brush bristles about the sides and top of the narrow opening so that as a cat progresses through the narrow opening, its back and sides are rubbed with the brush bristles. However, such devices require frequent cleaning and do not address the tendency for cats to leave considerable quantities of hair in their normal napping area. Such devices do not address the problem of attracting the cat to pass through what may be a narrow opening in an unpleasant combing apparatus, nor do they address the claw-sharpening problem.

Another problem associated with cats is the difficulty in safely and comfortably transporting the cat in a moving vehicle. Routine trips to the veterinarian for medical visits or the occasional trip transporting the cat to the kennel for boarding or even the vacation trip with the cat, can be somewhat traumatic and unsettling to the cat. It can be very dangerous, both for the cat and for the operator of a moving vehicle, for the cat to be allowed to roam unconfined in the moving vehicle. Pet harnesses and pet car seats utilizing pet harnesses have been used to restrain dogs in automobiles and are known in the art. These devices restrain the movement of the pet but do not prevent items from falling onto the pet in the event of a crash.

Also known in the art are wire cages and plastic-wire pet cages, as well as flexible lightweight nylon pet carriers having stiff tops and sides. However, confining the cat to a wire cage or to a seldom-used plastic-wire transporting cage can be very disturbing in the cat's routine.

Furthermore, the flexible nylon pet carriers and the flexible pet beds previously disclosed provide no rigid structural frame for anchoring the safety belt in a moving vehicle, nor do the flexible pet beds provide the necessary confinement for the cat. In a sudden braking situation, the safety belt may bruise or injure the animal.

Despite recognition of these various problems with cats as pets, the art has not responded to date with an article of cat furniture which is attractive to a cat and which provides a structurally rigid place of residence for the cat, and provides both an attractive surface for sharpening its claws and a means for removing and retaining hair from the cat. At the same time, what is also needed is a carrier for safely containing the article of cat furniture with which the cat is comfortable and to which the cat is accustomed when the cat is in a moving vehicle.

SUMMARY OF THE INVENTION

The present invention provides an article of cat furniture in the form of a transportable cat furniture device which provides a pleasant, attractive resting place for the cat and which also retains or removes loose hair from the cat. The present invention also includes a carrier for the cat furniture device for use in transporting a cat in a moving vehicle.

In one of its aspects, the furniture device for a cat has a housing having a top portion and an adjoining floor portion. The housing has at least one open end, an interior surface and an exterior surface, and defines an interior device cavity.

In the illustrated embodiment, the housing has a generally C-shaped cross-section, with the top portion of the housing comprising a partial section of a right circular cylinder which is cut parallel to the longitudinal length axis of the cylinder. The floor is planar and has a length dimension corresponding to the length axis of the cylinder. The floor has a width dimension corresponding to the chord distance of the partial section of the cylinder. The housing has two openable ends directed toward the respective ends of the partial cylinder.

The walls and the roof of the housing are constructed conveniently as a portion of a rigid cardboard tube and the floor is a rectangular planar cardboard portion so that the housing is sufficiently rigid that it will uphold the weight of at least 100 pounds on the top of the housing. The exterior of the housing is covered with a synthetic fur material, which provides a decorative appearance to the exterior of the cat furniture device while at the same time proving attractive to cats. The synthetic fur material is directed inwardly for a short distance on each end forming a narrow peripheral band on each edge.

The device includes a first material affixed to the housing and disposed within the interior cavity of the device such that it conforms to the interior surface of the top portion of the housing.

The first material has an exterior surface directed toward the interior cavity. The first material has a plurality of rubberized protuberances thereupon, with the protuberances on the exterior surface of the first material. The protuberances extend outwardly into the interior cavity. The exterior surface is adapted to attract and hold loose pet hair from a cat when a cat rubs against the surface.

The housing further includes a second material which is fastened to the first material and is generally rectangular, corresponding with the floor of the housing and is positioned thereupon. The second material is suitably a carpeting having generally parallel rows of compressible ribs. The parallel ribs are oriented parallel to the openings and parallel to the width dimension of the rectangular portion of the floor. This material has proven pleasing for cats to exercise their claws against and is very pleasing for them for resting purposes.

A layer of cushioning material is disposed between the top portion of the housing and the first material. This cushioning material, such as bubble wrap, foam rubber, batting, fiberfill or a combination of these, is attached at periodic intervals along the peripheral edge of the housing opening and is generally co-extensive with the top portion.

The first material and the second material in combination form a liner which overlies the cushioning material and the floor portion of the housing and covers the interior of the cavity. The liner is located between the peripheral bands of the synthetic fur material.

To further entice a cat to play with the structure and so to achieve the benefit of removal and retention of the cat's excess fur, an attracting means such as a mouse cat toy is pendently mounted by a string to the interior surface of the housing approximately equidistant from the ends of the housing.

The invention further includes a carrier for enclosing and transporting the furniture device containing a cat in a moving vehicle having a safety belt. The carrier comprises a carrier housing having a carrier top portion and a carrier floor portion joined to the carrier top portion. The carrier is configured and dimensioned to closely hold the furniture device. The carrier housing has a first end which is a closed end and a second end which is a reclosable end. The carrier housing defines an interior surface and an exterior surface. Each end is joined to the carrier floor portion. The reclosable end is releasably fastened to the side walls and roof portion using a fastener means such as a zipper to close the reclosable end to a fastened state. A perforate panel penetrates at least one of the carrier housing ends, preferably the reclosable end. A pair of handles are affixed opposite one another to the top portion. Two pairs of feet are located on the exterior floor of the carrier with the pairs of feet parallel to and spaced from each other. A safety strap is centrally positioned on the exterior surface of the roof of the carrier top portion. The safety strap has two ends and a middle portion therebetween and is fastened securely to the roof at each of the two ends.

In operation, the reclosable end of the cat carrier is unfastened along the top portion of the carrier to an open state. The furniture device is then inserted into the interior of the carrier, a cat is placed into the furniture device, and the reclosable end of the carrier is zipped or otherwise fastened into a closed or fastened state. The cat carrier is carried by the handles to the motor vehicle, placed on a seat in a vehicle having a safety belt, and the safety belt is threaded through the safety strap. The safety belt is fastened, thereby securing the cat carrier in the vehicle. This permits the cat to be confined in a comfortable, familiar housing and safely secured in the carrier for a motor vehicle trip.

In another embodiment, this invention provides a cat transportation kit having the cat furniture device of the present invention as previously described and the cat carrier of the cat furniture of this invention as previously described.

Yet another embodiment of this invention provides for the cat carrier as previously described for use in combination with the cat furniture as previously described.

An advantage of the present invention is that it provides an article of cat furniture which forms an attractive resting place for a cat and which has rigid structure, and which retains or removes hair from the cat resting therein. Another advantage of the present invention is that it provides an article of cat furniture that provides a surface for the exercising and sharpening of the cat's claws thereon. Yet another advantage of the present invention is that it provides a cat carrier for the article of furniture which forms a safe, familiar carrier for transporting the cat in a moving vehicle.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

DESCRIPTION OF THE PREFERRED EMBODIMENT

Figure 1:
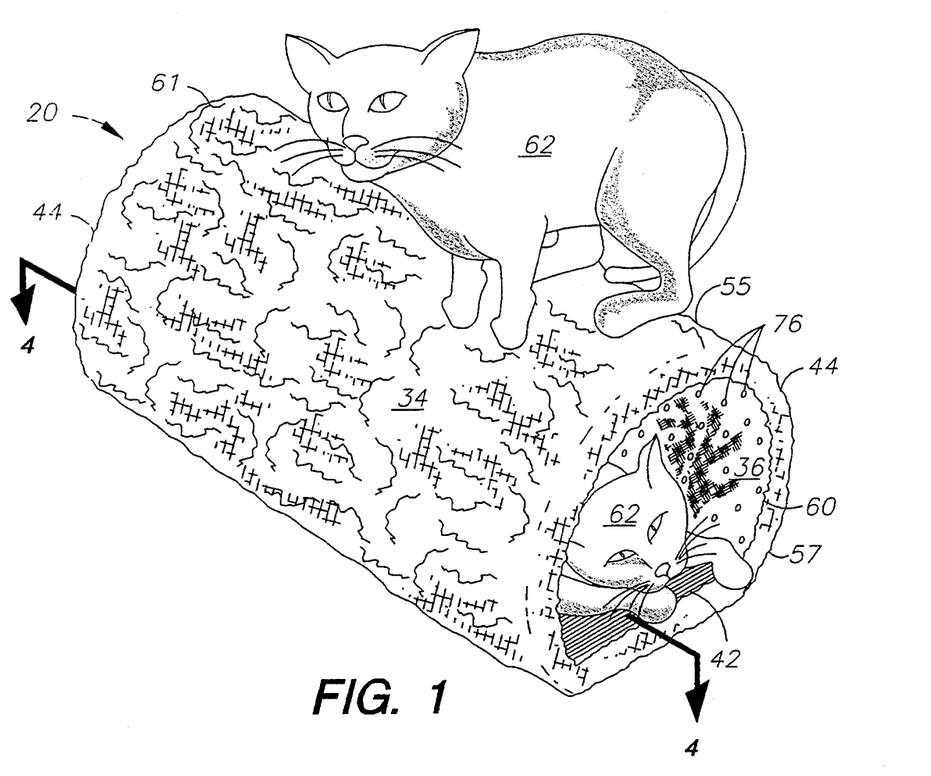
FIG. 1 is a perspective view of the cat furniture device of this invention, with cats engaged in play thereon.

Referring particularly to FIGS. 1-9, wherein like numbers refer to similar parts, a cat furniture device in accordance with the present invention is designated generally as 20. FIG. 1 illustrates cats playing in and on it.

Figure 3A:
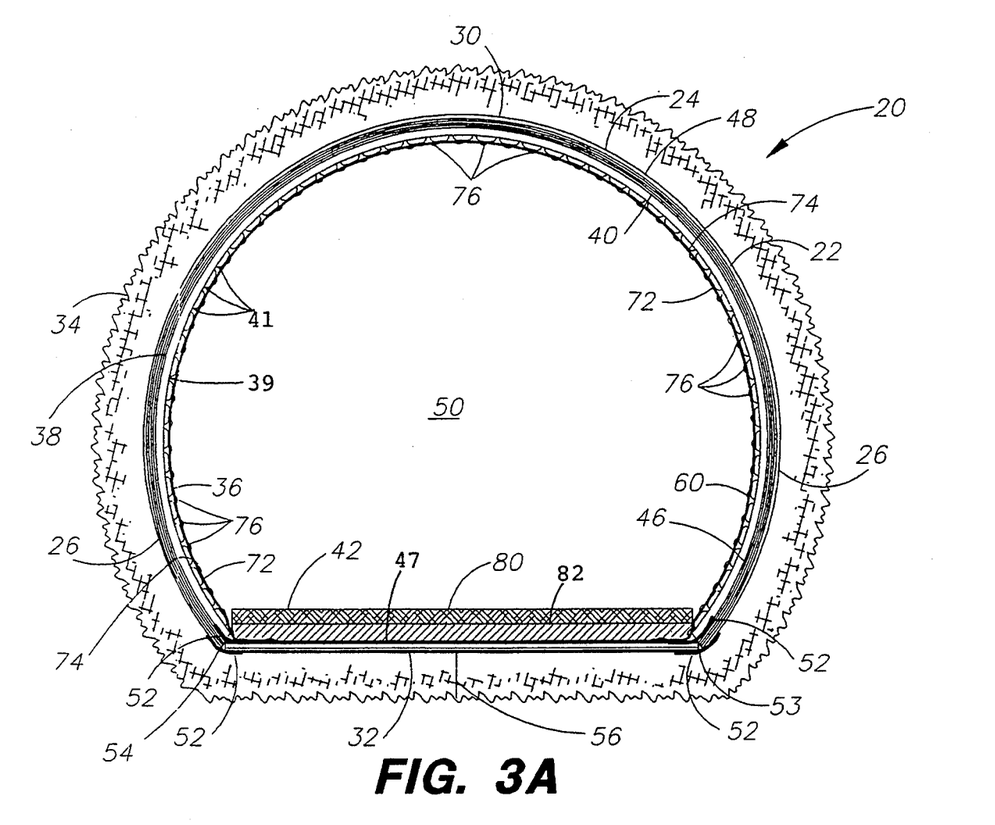
FIG. 3A is a cross-sectional view of the furniture device of FIG. 2 taken along section line 3—3.
Figure 4A:
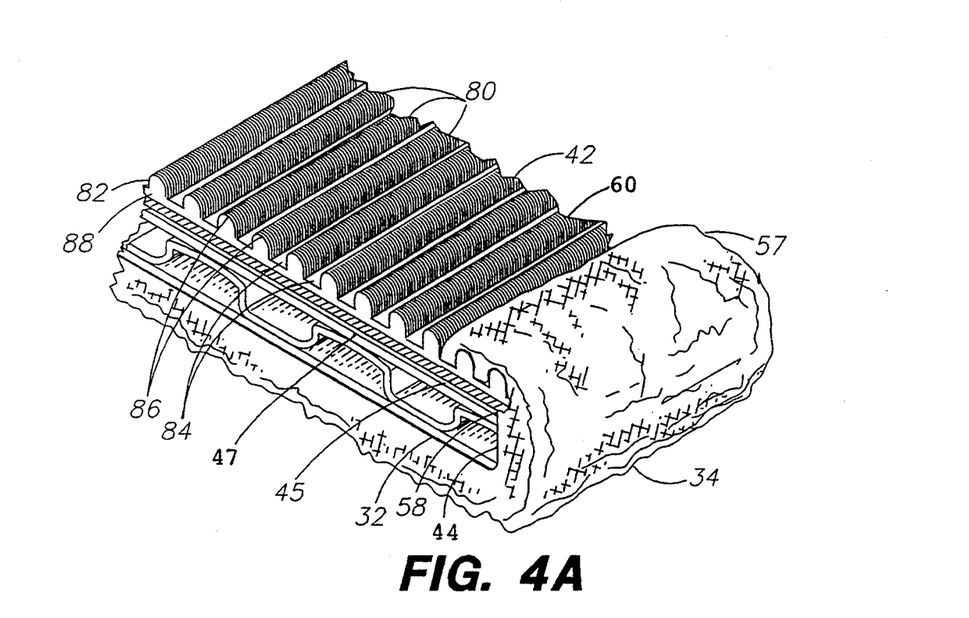
FIG. 4A is an enlarged fragmentary isometric cross-sectional view of the cat furniture device of FIG. 1 taken along section line 4—4.
Figure 5:
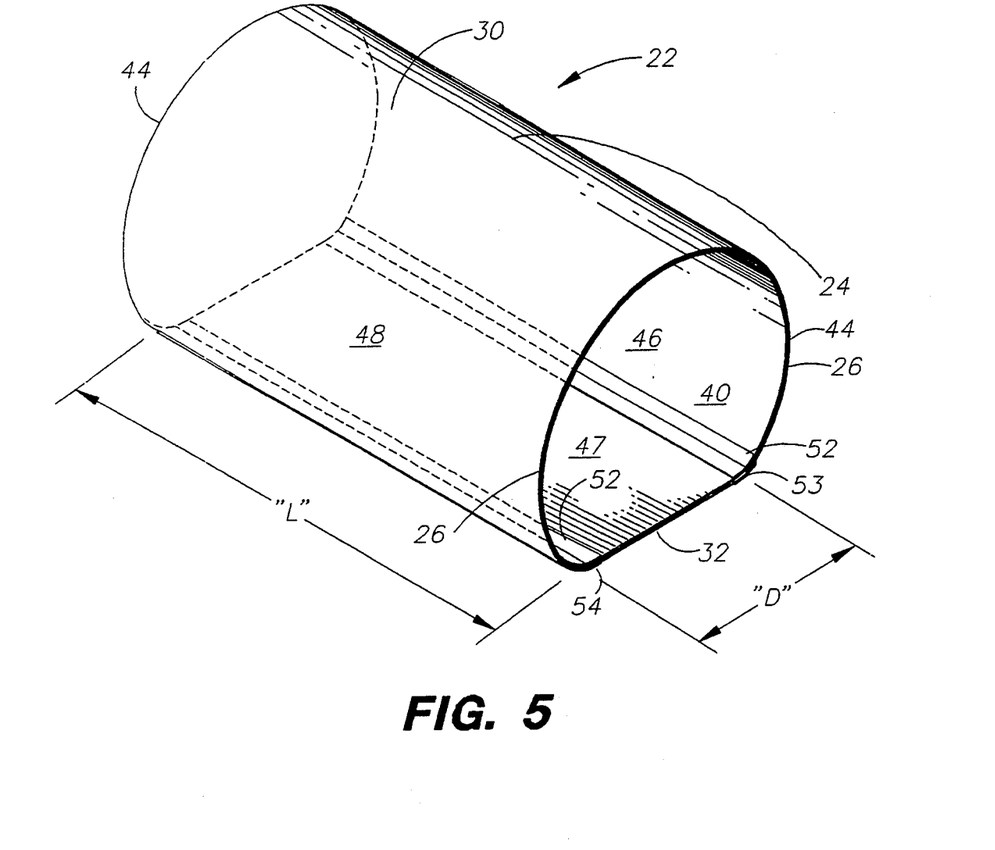
FIG. 5 is an isometric view of the housing of the cat furniture device of FIG. 1.

Referring particularly to FIGS. 3A, 4A and 5, a cat furniture device (20) includes a housing (22) having a housing top portion (24) that is substantially cylindrical and a housing floor portion (32) that is substantially planar. The housing top portion has an interior surface (40), a pair of housing side walls (26) and housing roof (30). The housing (22) defines an interior housing surface (46) and an exterior housing surface (48), and an interior device cavity (50). The floor portion (32) has an interior surface (47). The interior surface (40) of the housing top portion (24) and the interior surface (47) of the housing floor portion (32) form the interior housing surface (46).

The device (20) also includes an outer covering material (34) covering the exterior housing surface (48), a first inner covering material (36) for attracting loose cat fur disposed within the device cavity and generally conforming to the interior surface (40) of the top portion housing surface (24), a cushioning layer (38) adjacent to the interior surface (40) of the housing top portion (24) and disposed between the interior surface (40) of the housing top portion (24) and the first material (36), and a second inner covering material (42) which covers the flooring portion (32) and upon which cats may exercise their claws. By "generally conforming" is meant that the size and configuration of the first material (36) corresponds to at least the size and configuration of the interior surface (40) of the housing top portion (24) and is generally coextensive with the housing top portion. Preferably, the second material (42) is sewn to the first material (36), forming an interior liner (60).

Figure 2:
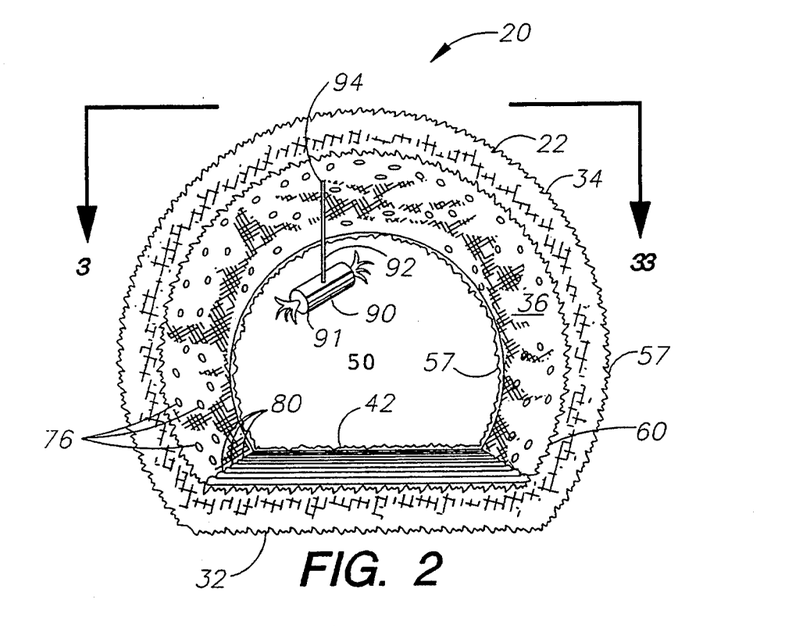
FIG. 2 is a perspective front view of the cat furniture device of FIG. 1 showing a cat toy therein.

FIG. 2 illustrates a perspective front end view of the cat furniture device of FIG. 1 with a cat toy (90) hanging interiorly from the roof of the housing, showing the outer covering material (34), the first inner covering material (36), and the second covering material (42) which cover the housing (22).

As best shown in FIGS. 2, 3A, 4A and 5, the housing floor portion (32) adjoins and is affixed to the housing top portion (24) along the housing side walls (26). The housing (22) has at least one housing open end (44). Preferably, the top portion (24) and flooring portion (32) of housing (22) are constructed of cardboard, forming a rigid device structure. Preferably, the side walls (26) and roof (30) are made from a pressboard right circular cylindrical cardboard tube (not shown) which is truncated parallel to the longitudinal length axis of the cardboard cylinder to remove an arc portion (not shown). The portion remaining forms the top portion (24) of the housing (22).

FIG. 3A illustrates the cross sectional view of the cat furniture device of FIG. 2 taken along section line 3—3 showing the respective components of the device in relation to each other. The section line 3—3 is taken through a plane parallel to the open end (44) and not including the cat toy (90). The walls (26) and roof portion (30) are shown in cross sections in FIG. 3A. It is noted in this figure the first material (36) extends partially over the interior surface (47) of the housing floor portion (32). Preferably the first material (36) extends about 1 inch on each side onto the housing floor portion (32) along the side walls (26).

FIG. 4A illustrates an enlarged fragmentary isometric cross section of the cat furniture device of FIG. 1 taken along section line 4—4. FIG. 4A shows the floor (32) in partial cross section, illustrating the liner (60) where second material (42) is disposed directly upon the interior surface (47) of the housing floor portion (32) and is generally coextensive with the housing floor portion (32).

Figure 3B:
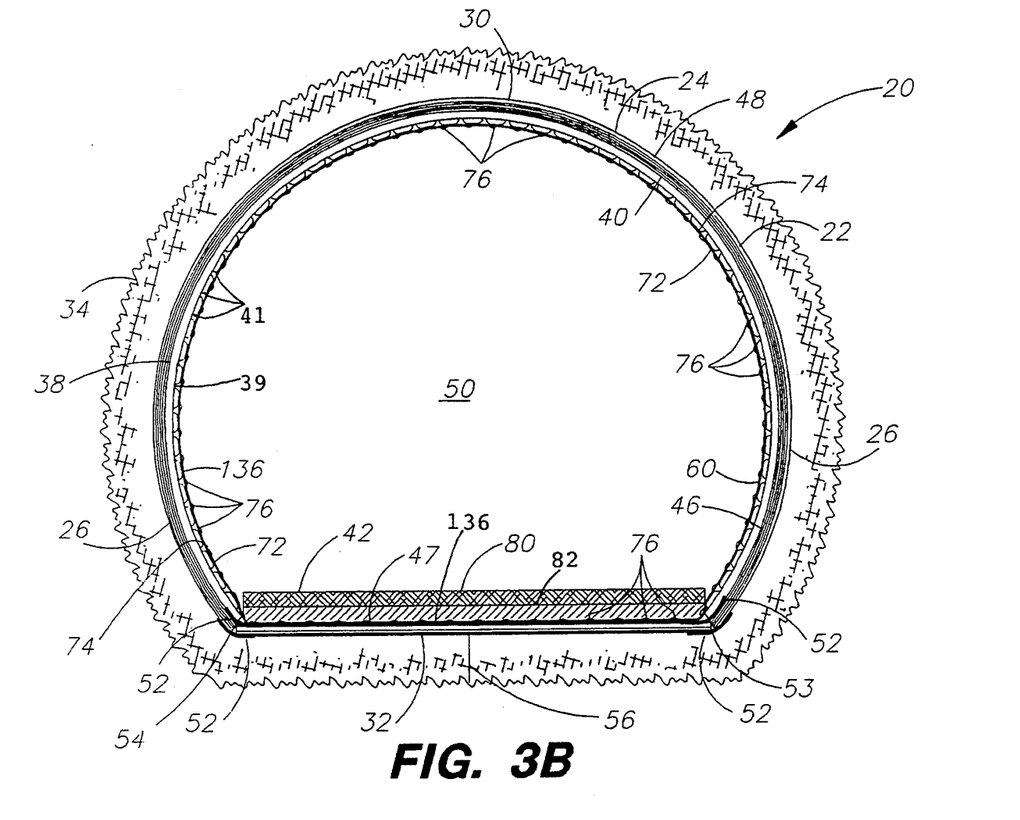
FIG. 3B is a cross-sectional view of the furniture device of FIG. 2 taken along section line 3—3 showing the first material coextensive with the interior surface of the housing floor.
Figure 4B:
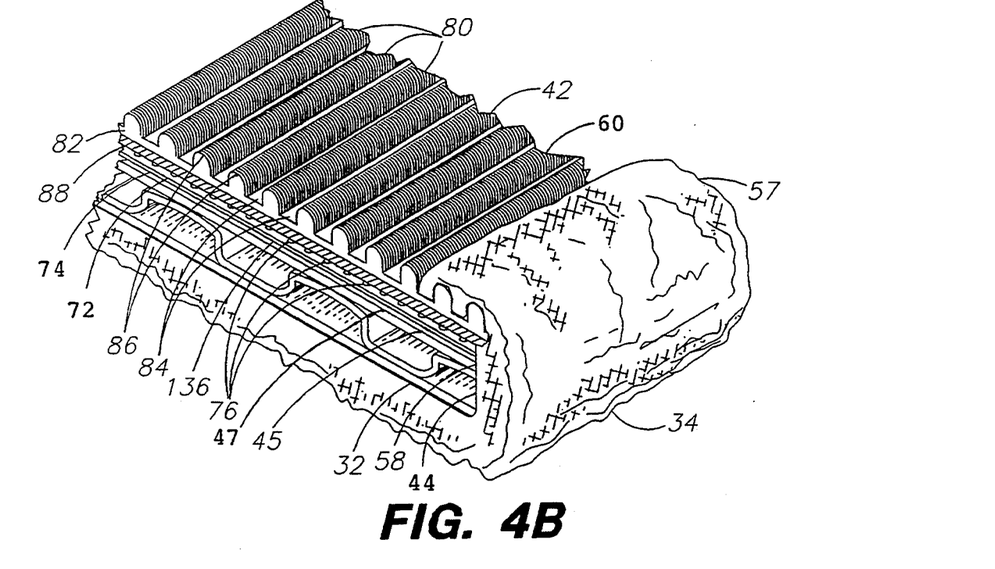
FIG. 4B is an enlarged fragmentary isometric cross-sectional view of the cat figure of FIG. 1 taken along section line 4—4 showing the first material coextensive with the interior surface of the housing floor.

FIGS. 3B and 4B show an alternative way of fabricating the liner (60) of the device (20). The liner (60) can be fabricated so that the first material (136) is coextensive with the interior surface (47) of the housing floor portion (32). FIG. 4B shows the second material (42) disposed directly upon the first material (136), which is disposed directly upon the interior surface (47) of the housing floor portion (32). The device is identical in all other respects to that illustrated in FIGS. 1-3A and 4A-9, and is numbered identically. The first material (136) has the same properties with respect to attracting loose cat fur as that numbered as (36) in FIGS. 3A and 4A.

FIG. 5 illustrates an isometric view of the housing (22) of the cat furniture device of FIG. 1. As best shown in FIG. 5, this top portion (24) forms a tunnel-like partial cylindrical structure having two opposite identically shaped open ends (44) and having a generally C-shaped cross section formed by the walls (26) and roof (30), with the distance "D" between the arms of the "C" corresponding to the chord distance of the removed arc. The length of the housing "L" corresponds to the longitudinal axis of the cylinder. The length of the walls is suitably about 18 inches long, with approximately 12 inches interior diameter from wall to wall. The walls and roof portion are about ¼ inch thick. The inner dimension of the housing, roof (30) to floor (32), is approximately 11 inches. A suitable pressboard cylindrical cardboard container is commercially available from Erde Paper Tube Co. of Lorain, Ohio.

Between the cardboard side walls (26) of the housing top portion (24) is the cardboard floor portion (32) which is fastened to the housing top portion by means of a tape (52), glue or both, or other adhesive materials along joinder lines (53), (54). The floor portion (32) is substantially planar and has a length dimension "L" corresponding to the length axis of the cylinder and has a width dimension corresponding to the chord distance "D" of the partial section of the cylinder. The floor portion is approximately 8 inches wide by 18 inches long and has a thickness of ⅛ to 3/16 inch, with a preferred thickness of 3/16 inch. The corrugated cardboard floor material is available from Erde Paper Tube Co., Lorain, Ohio. The cardboard housing (22) achieves a safety advantage since the cardboard housing (22) has inherent stiffness and rigidity of a partial cylinder and can resist the weight of small children lying or sitting thereon. The device as constructed can accommodate at least 100 pounds of weight upon it without deforming.

As best shown in FIG. 3A, a layer of a cushioning material (38) is placed along the inside surface (40) of the side walls (26) and roof (30) of the cylindrical C-shaped top portion (24) of the housing (22). The cushioning layer (38) is spaced approximately ½ to 1 inch from each of the housing ends (44). A preferred cushioning material is a sheet of bubble wrap packing material approximately 17 inches long by 29 inches wide having its length dimension approximately centered between open ends (44) and aligned along the length of the housing where the floor adjoins the side wall at joinder lines (53) and (54). The width dimension of the cushioning material is placed along the C-shaped top portion (24) of the housing (22). Bubble wrap packing material has a backing portion (39) and plurality of individual air filled bubbles (41). A suitable bubble wrap packing material is available from Associated Bag Co. of Milwaukee, Wis. catalog number 32-8-51. Preferably the bubble wrap packing material has an overall thickness of about 3/16 inches, and includes a backing (39) thickness of about 5 mils with individual bubbles (41) of ⅛-inch diameter. Other types of cushioning material may be used, such as ⅛ to ½-inch foam rubber, cotton padding or quilting batting, or polyester fiberfill, all commercially available from fabric stores or commercial upholstery outlets. The cushioning layer (38) is secured to the side walls (26) of the housing (22) along joinder lines (53) and (54). The edges of the cushioning layer near the open housing ends (44) are fastened intermittently to the housing ends (44) and to the exterior surface (48) of the housing along the side walls (26) and roof (30) of the device. The cushioning layer (38) may be taped in place using strapping tape or may be fastened by gluing or bonding or as in other ways known in the art. Alternatively, a smaller sheet of the cushioning material layer (38) may be used with the sheet edges fastened to the side walls above the joinder lines (53), (54).

Figure 6:
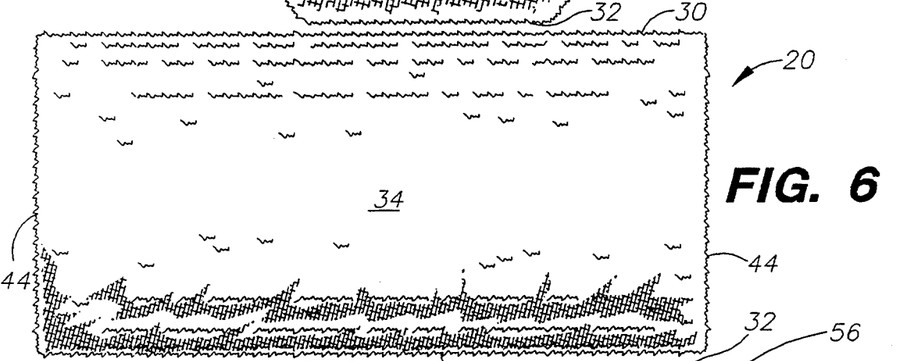
FIG. 6 is a left side plan view of the cat furniture device of FIG. 1. The right side plan view is identical.
Figure 7:
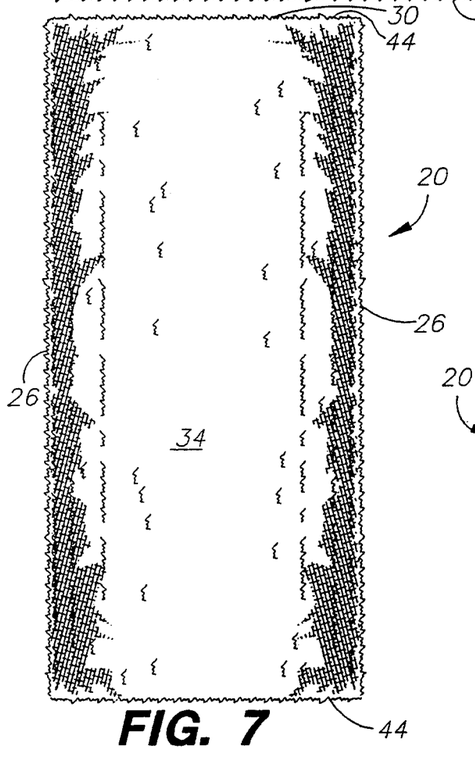
FIG. 7 is a top plan view of the furniture device of FIG. 1.
Figure 8:
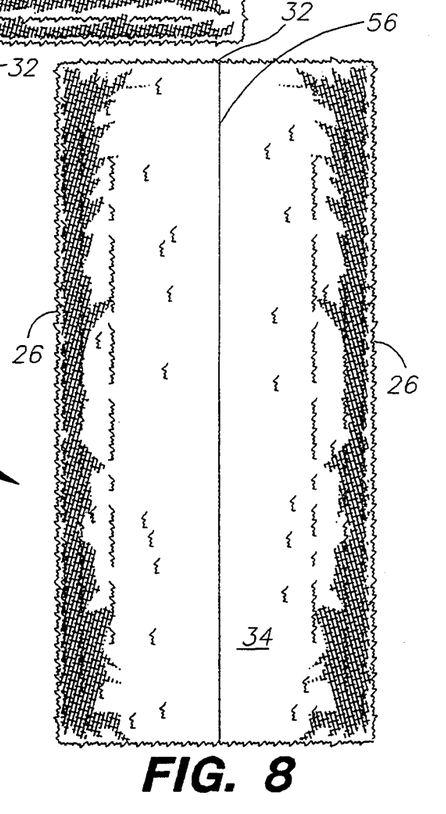
FIG. 8 is a bottom plan view of the furniture device of FIG. 1.

The exterior surface (48) of the housing (22) is covered by an outer layer of synthetic fur (34). FIG. 6 illustrates the left side plan view of the cat furniture device of FIG. 1 showing the exterior surface of the housing covered by synthetic fur (34). The right side plan view (not shown) is identical. FIG. 7 illustrates the top plan view of the cat furniture device of FIG. 1. The synthetic fur (34) is sewn into a cylindrical or tubular open-ended sack (55) with a seam line (56). FIG. 8 illustrates the bottom plan view of the cat furniture device of FIG. 1, showing the seam line (56). The synthetic fur outer layer (34) sack may be draped or bonded to the exterior of the housing (22) and has a portion extending over each of the two outer ends (44) of the housing into the interior cavity (50) of the device. A typical synthetic fur material is 100% acrylic fabric which may be purchased from Mitsubishi Int'l. Corp. of New York, N.Y. The synthetic fur (34), by covering the stiff outer end (44) of the housing (22) forms an attractive rubbing edge (57) on the outer end (44) against which a cat may rub certain glands located on sides of their faces. This rubbing action appears to increase their infatuation with an object such as the furniture device (20).

As shown in FIGS. 3A and 4A and in FIGS. 3B and 4B, the interior liner (60) is disposed within the interior cavity of the device and is formed by joining the first material (36) and the second material (42). Preferably the first material (36) is of a size and a configuration to correspond to the size and configuration of the interior surface (40) of the top portion (24) of the housing (22). The first material (36) in general conforms to the interior surface (40) of the top portion of the housing. Preferably, the second material (42) is of a size and a configuration to correspond to the size and configuration of the interior surface (47) of the floor portion (32) of the housing. The second material (42) in general conforms to the interior surface (47) of the floor portion (32) of the housing. The second material (42) is sewn or affixed or fastened to the first material (36) so that the first and second material form a liner (60) which is dimensioned to fit within the interior surface (46) of the housing, allowing for the first material (36) to rest adjacent the cushioning layer (38). However, the second material (42) may be dimensioned slightly smaller than the floor portion, in which case the first material is made slightly larger than the top portion so that liner (60) remains dimensioned to fit within the interior surface (46) of the housing allowing the first material (36) to rest adjacent the cushioning layer (38) and the second material (42) over the floor portion (32). Alternately, the second material (42) may be dimensioned slightly larger than the floor portion in which case the first material is slightly smaller than the top portion of the housing so that the liner (60) remains dimensioned to fit within the interior surface (46) of the housing as previously described.

Preferably, the liner (60) is formed by sewing the second material (42) to the first material (36) to form a generally cylindrical or tubular sack of liner (60) having two open ends. The liner (60) is sewn to the synthetic fur (34) by sewing one of the edges of one of the open ends of the liner (60) cylindrical sack to one of the edges of the open ends of the synthetic fur cylinder sack (55) forming a surfaces cover piece (61).

The surfaces cover piece (61) is draped snugly over the housing (22) with the synthetic fur cylinder (55) disposed on the exterior surface (48) of the housing (22) and the liner (60) directed inwardly so that the first material (36) is directed inwardly and adjacent to the interior surface (40) of the top portion (24) of the housing (22) and over the cushioning material layer (38) and with the second material (42) directed inwardly and adjacent to the inner surface (47) of the housing floor portion (32).

The surfaces cover piece (61) is draped so that a narrow peripheral band of synthetic fur fabric is directed inwardly to form a narrow peripheral band of synthetic fur fabric or rubbing edge (57) on one of the two open ends (44). The rubbing edge (57) is approximately ½ to 2 inches from an end (44). The second open end (44) is finished by preferably draping the first material (36) around the second open end (44) and fastening the first material to the exterior housing surface (48) of the device (20). Alternatively, the first material (36) may be fastened by gluing or taping the unsewn edge of the first material to the interior surface (47) along interior peripheral lip (58) of the second housing end (44)

along a fastening line (45) running along the interior periphery of housing end (44). Preferably, each rubbing edge (57) is approximately 1½ inches from each end.

In either case, the synthetic fur fabric is pulled over the first lining material (36) and over the second material (42) along the second end (44) and taped or glued or held by Velcro ™ over the first material (36) and over the second material to form the second rubbing edge (57) which preferably is identically dimensioned to the first rubbing edge (57).

Alternatively, as shown in FIGS. 3B and 4B, the liner (60) can be fabricated so that the first material (136) is coextensive with the interior surface (47) of the floor portion (32) of the housing (22). The second material (42) is sewn onto the first material so that the second material (42) overlays the first material (136) above the floor portion (32) of the housing (22). The device as shown in FIGS. 3B and 4B is identical in all respects to that in FIGS. 3A and 4A, except that the first material (136) is adjacent to the floor portion. The liner (60) in FIGS. 3B and 4B is formed by sewing the first material (136) into a cylindrical tubular open ended liner sack. Then the second material (42) is sewn to the first material (136). The liner (60) is joined to the synthetic fur material as previously described to form the surfaces cover piece (61). The surfaces cover piece is affixed to the housing (22) as was previously described. In FIGS. 3B and 4B, the first material (136) is of a size and configuration corresponding to the size and configuration of the interior housing surface (46), with the second material overlaying the interior surface of the floor portion (47) and spaced from it by the first material (136).

The first material (36), (136) as shown in FIGS. 3A and in FIGS. 3B and 4B which lines the interior of the device (20) has an exterior surface (72) facing the interior cavity (50) of the device (20) and an opposing interior surface (74) facing the interior surface of the housing (46). The interior surface (74) is adjacent the cushioning layer (38) and part or all of the interior surface (47) of the housing floor (32). The first material (36), (136) exterior surface (72) is adapted to attract and hold loose pet hair from a cat. Preferably, the exterior surface (72) has a plurality of rubberized raised protuberances (76) upon it. Each rubberized raised protuberance (76) extends outwardly from the fabric exterior surface (72) into the interior cavity (50) of the device (20). Typically the first material (36), (136) is a cotton twill fabric with the raised rubberized protuberances (76) in the shape of small circles or dots. Preferably, these dots are formed at a frequency of about 40 dots per square inch, the dots are approximately 2 mm in diameter and less than 1 mm in height. Preferably, the first material (36), (136) is a 100% cotton fabric with rubberized dots on one of the two sides or surfaces of the fabric and is available from Mitsubishi Int'l. of New York, N.Y. The rubberized protuberances (76) are tacky and the rubbing of the cat's fur against the protuberances (76) permits the loose fur to stick to the exterior surface (72) of the first material (36), (136) of the device (20). The rubberized protuberances (76) attract the loose cat fur and the cotton holds the loosened fur. As a cat (62) plays or resides within the furniture device (20), hair is removed by the protuberances (76) on the first lining material (36), (136).

Cats are attracted to the interior cavity (50) of the device (20) by several features of the cat furniture device. One of these features resides in the second material (42) which is affixed to the first material (36), (136). As best shown in FIGS. 2, 3A and 4A, the second material (42) is affixed to the first material (36), (136) and is located above the floor portion (32) of the housing (22).

In either FIGS. 3A and 4A or in FIGS. 3B and 4B, the second material (42) is generally co-extensive with the floor portion (32). The second material (42) has a plurality of compressible soft nonbristly ribs (80). The ribs (80) are parallel to the open end (44) and are directed toward the interior cavity (50) of the device (20). The second material (42) overlays the floor portion (32) of the housing (22). In the illustrated embodiment, FIGS. 3A and 4A, the second material (42) has a length of approximately 18 inches and a width of approximately 8 inches and is sewn onto the first material (36), (136) along the peripheral edges of the length of the second material (42). The width dimension of the second material preferably does not exceed the width of the floor portion (32) of the housing (22). The second material (42) has a base (82) and a series of ribs (80) extending upwardly from the base (82). The ribs are disposed parallel to each other and parallel to the width of the second material (42). The ribs (80) are compressible and have rib spacings (84) between a pair of ribs (80). The ribs are spaced approximately ¼ inch apart. Each rib has a rib height (86) of preferably ¼ inch. Preferably, this second material (42) is a soft nonbristly 100% nylon material marketed under the trademark Move Not II ™ available from Vantage Industries of Atlanta, Ga. Alternatively, the second material may be a 100% polyester or wool carpeting having looped ridges or ribs. The second material (42) has a cushioned latex backing (88). However, the cushioned latex backing (88) is not essential to the working of the device. Alternatively, a hand-knotted oriental rug fabric having the aforementioned rib heights and spacings may be used as the second material. A latex backing may be applied to the nonribbed side of the oriental rug.

Figure 9:
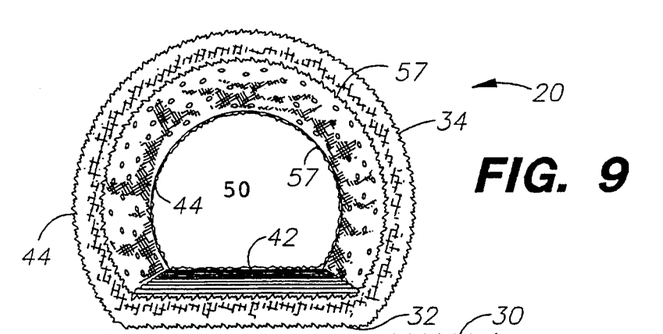
FIG. 9 is a perspective front view of the cat furniture device of this invention. The back view is identical.

FIG. 9 illustrates a perspective front view of the device. The back view is identical.

Cats are naturally inclined to reside in enclosed environments and the C-shaped tunnel-like structure formed by the interior cavity (50) of the device (20) is attractive to cats for this reason. As best shown in FIG. 2, to attract cats to the interior cavity (50) of the furniture device (20), a means for attracting cats such as cat toy (90) is pendently mounted by a string (92) to the inside surface (46) of the roof portion (30) of the housing (22). The cat toy (90) which may consist of a dumbbell-shaped toy (91) or a mouse fabricated of rabbit fur (not shown) is suspended by a string (92) approximately 3 inches long from the attachment point (94) orienting the cat toy to hang at or slightly above the central axis of the cylindrical portion of the partial housing (22).

In the course of playing with the toy, the cat will rub about the first lining material (36), (136) within the interior cavity (50) of the device (20). Thus, the actions of the cat in the furniture device (20) bring the cat into contact with the lining material (36), (136) advantageously removing and collecting loose hair from the animal.

In order to initially attract the cat to the furniture device (20), it may be desirable to sprinkle small quantities of catnip (not shown) on the interior surface of the furniture device (20). A cat normally responds to catnip by attempting to roll or brush its body against the catnip. This rolling or brushing produces the desired result of bringing the cat into contact with the materials (36, 42), (136, 42) and the interior of the device (20).

Figure 10:
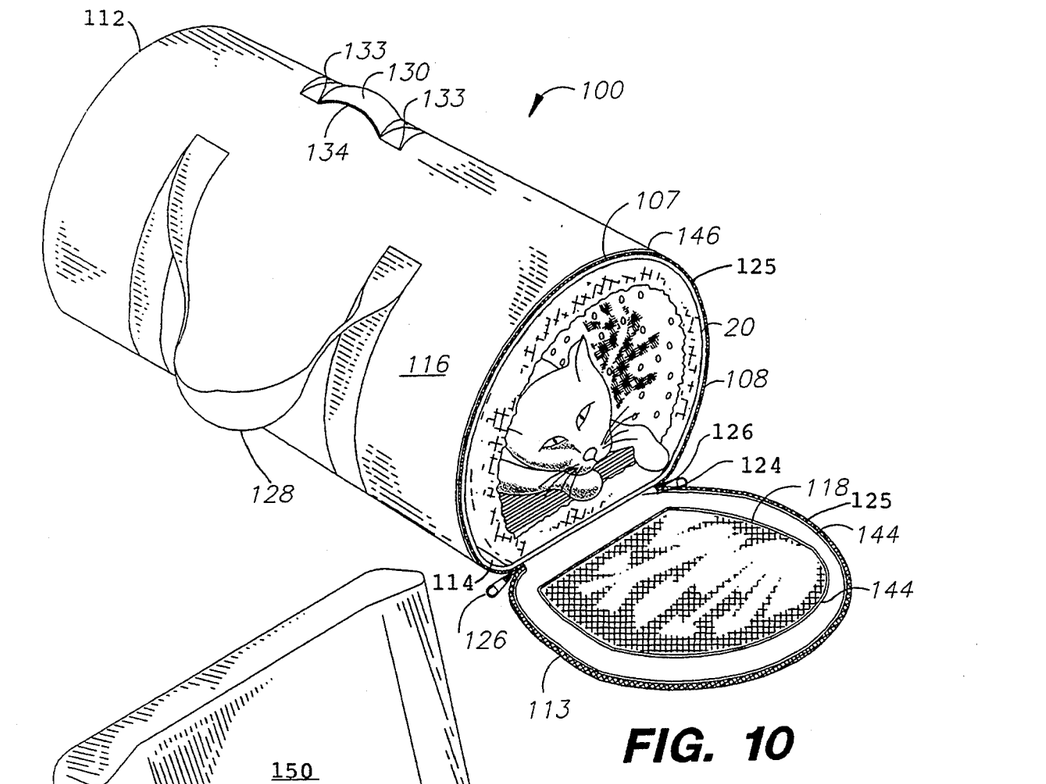
FIG. 10 is a perspective view of the carrier of the cat furniture device of this invention with the cat furniture device loaded within the carrier and having the reclosable end open.
Figure 11:
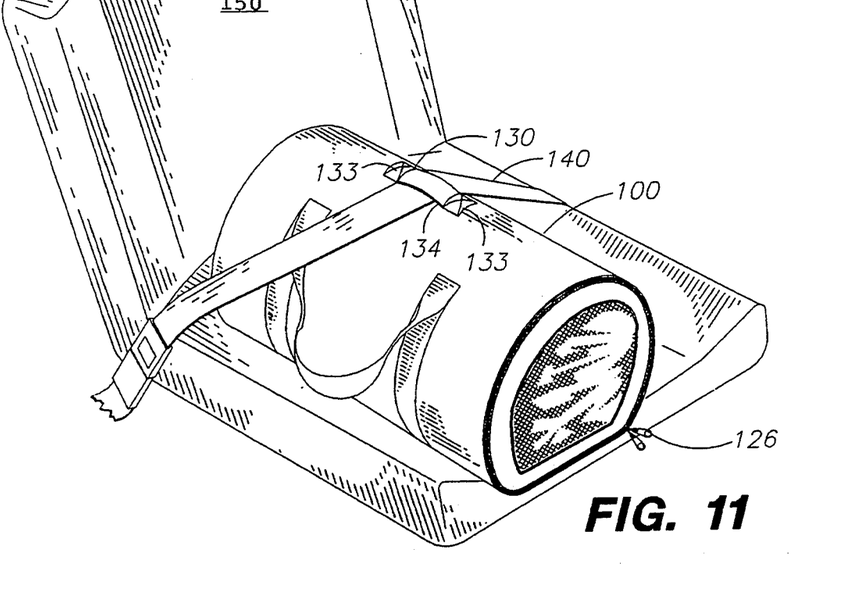
FIG. 11 is a perspective view of the carrier of the cat furniture device of this invention, with the cat furniture device loaded with a cat within the carrier and having the reclosable end fastened and the carrier safely secured by the safety belt of a motor vehicle.

As illustrated in FIGS. 10 and 11, in another aspect, the present invention provides a cat carrier (100) for use in combination with the cat furniture device (20) when the cat is to be transported. The carrier (100) is configured and dimensioned to receive the furniture device (20). As best shown in FIGS. 12-17, wherein like numbers refer to similar parts, the cat carrier (100) has a carrier housing (102) having a carrier top portion (104) and a carrier floor portion (106) joined to the carrier top portion (104). The carrier top portion has a roof (107) and side walls (108) which form a generally cylindrical C-shaped unit. Each side wall (108) has a side wall end portion (109). The carrier floor portion (106) has a planar rectangular floor having two long sidewalls (110) and two wide sidewalls (111). Each of the floor long sidewalls (110) is joined to a respective side wall end portion (109). The carrier housing (102) has a C-shaped first end which is a closed end (112) which is joined to the top portion (104) and to one of the wide sidewalls (111) of the floor portion (106). A C-shaped second end which is a reclosable end (113) is fixedly joined to the other wide sidewall (111) of the floor portion (106). The carrier (100) defines an interior surface (114) and an exterior surface (116).

Figure 12:
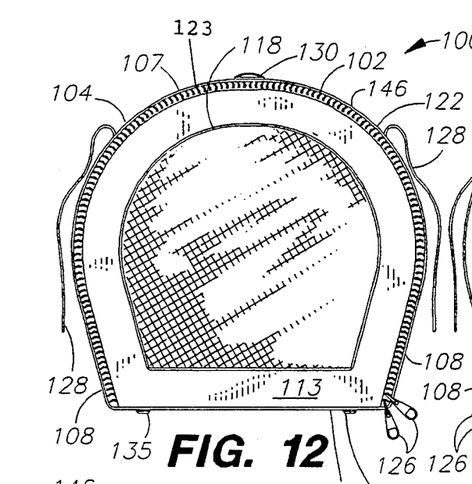
FIG. 12 is a front plan view of the carrier of the cat furniture device of this invention with the reclosable end fastened.
Figure 13:
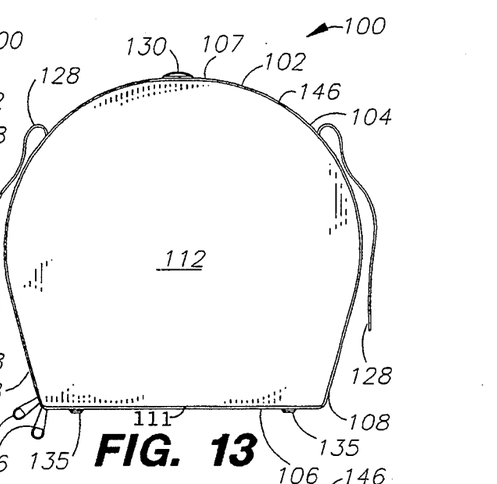
FIG. 13 is a back plan view of the carrier of the cat furniture device of this invention.

A perforate panel (118) penetrates at least one of the carrier housing ends (112, 113). Preferably, the cat carrier (100) has an imperforate closed end (112) and a reclosable end (113) having a perforate portion (118) therein. A safety strap (130) is centrally positioned on the roof (107) of the carrier top portion (104). A fastener (122) fastens the opened reclosable end (113) to a closed or fastened state. In operation the reclosable end (113) is unfastened along the top portion (104) of the carrier (100). The reclosable second end (113) is fixedly joined at seam (124) to the floor portion (106) and is releasably fastened to the side walls (108) and roof (107) portion using a fastening means (122) such as a zipper (123) to close the opening. A handle (128) is attached to each side wall (108) of the carrier (100) for carrying the cat carrier.

Figures 14, 15:
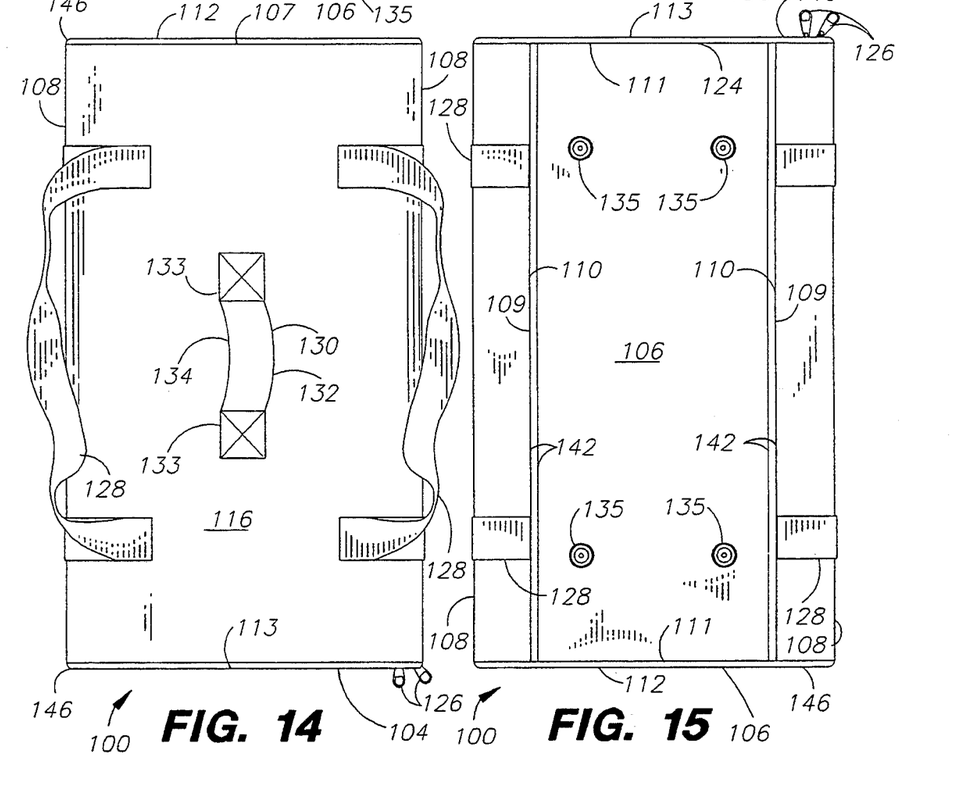
FIG. 14 is a top plan view of the carrier of the cat furniture device of this invention.
FIG. 15 is a bottom plan view of the carrier of the cat furniture device of this invention.

A safety strap (130) is fastened securely to the roof (107) at the top portion (104) of the carrier (100) on the exterior surface (116). The safety strap (130) has two identical ends (133) and a middle portion (134) between the two ends (133). Each of the two ends (133) is securely fastened or joined to the exterior surface (116) of the roof (107). The middle portion (134) of the safety strap (130) is unattached to the carrier (100). Preferably, the middle portion (134) of the safety strap is centered with respect to the center (132) of the roof (107). On the exterior surface of the floor portion (106) of the carrier (100) are four feet (135) for placing the carrier (100) in a raised position.

In operation, the cat furniture (20) of the present invention is slid into the cat carrier (100). The cat (62) is placed within the carrier (100). The releasable fastener (122) is closed. The cat carrier (100) is carried by the handles (128) to the motor vehicle (not shown). The carrier (100) is placed on the seat (150) of the motor vehicle having a safety belt (140) and the safety belt (140) is threaded through the safety strap (130) so that the safety belt (140) is between the middle portion (134) of the safety strap (130) and the exterior carrier surface (116). The safety belt (140) is then secured. This permits the cat (62) to be confined in a comfortable, familiar rigid housing (20) and safely secured in the carrier (100) for a motor vehicle trip. The combination of the strength of the rigid housing and the safety strap of the carrier make the combination of the cat carrier and portable furniture device particularly attractive for safely transporting the cat in a moving vehicle.

Figure 16:
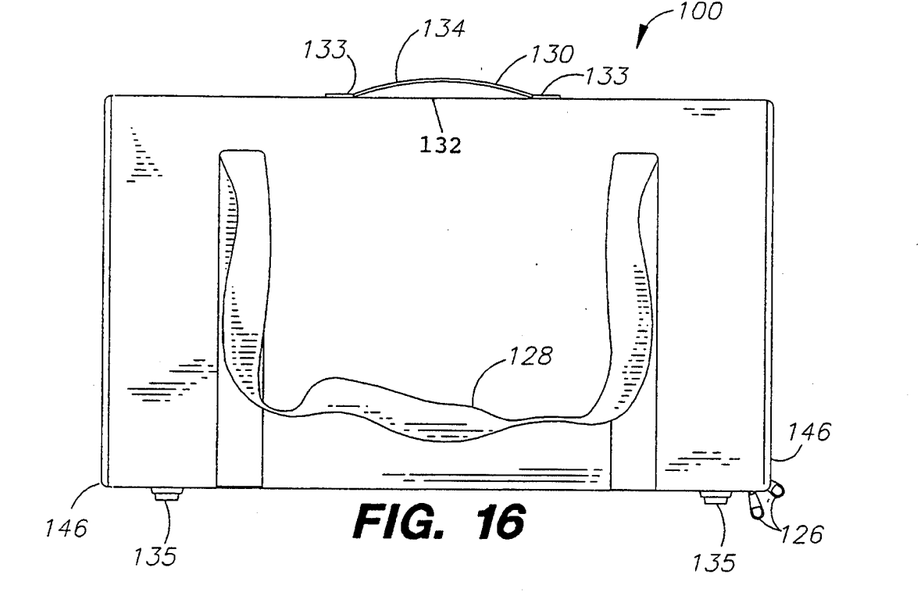
FIG. 16 is a left side plan view of the carrier of the cat furniture device of this invention.
Figure 17:
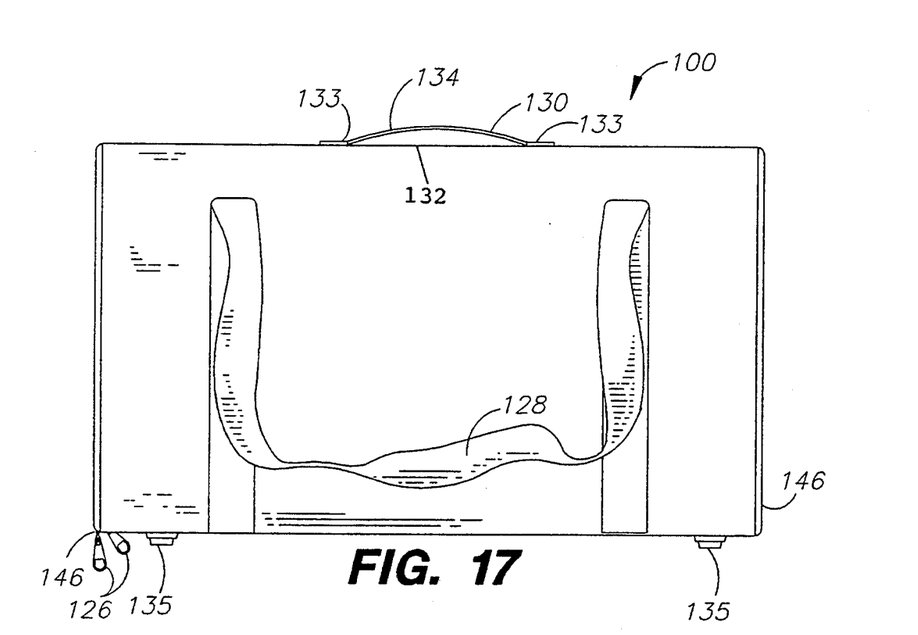
FIG. 17 is a right side plan view of the carrier of the cat furniture device of this invention.

FIG. 12 shows the front view of the carrier (100) with the reclosable end (113) in the closed position with the fastener (122) fastened. The fastener (122) is preferably a zipper fastener (123) having conventional zipper tapes (125) and zipper tabs (126). FIG. 13 shows the back view of the carrier (100) showing the C-shaped structure of the housing which corresponds to that of the cat furniture device (20) of the present invention. FIG. 14 shows the top view of the carrier showing the two side handles (128, 128) and the centrally positioned top safety strap (130). FIG. 16 shows the left side view of the carrier (100), showing the feet (135) and the side handle (128) and the top safety strap (130). FIG. 17 shows the right side view which is similar to the left side view. FIG. 15 shows the bottom view showing the feet (135) on the carrying device along with the floor seam lines (142) of the device. The floor seams (142) are defined where the top portion and the floor portion are sewn and double stitched. FIG. 10 illustrates a perspective view of the cat carrier of this invention with the cat furniture fitted securely within the carrying device with the reclosable end (113) opened. FIG. 11 illustrates a perspective view of the carrier used in combination with the cat furniture of this invention with the cat inside (not shown) having the reclosable end (113) fastened and having the safety belt (140) threaded through the top safety strap (130) with the device on a seat in a motorized vehicle.

Preferably, the cat carrier (100) of the present invention is made of a flexible fabric having a plastic backed interior surface. This fabric is durable, resistant to surface tearing and abrasion, and easy to clean. The fabric is easily sewn. This fabric is preferably nylon and is available from Mitsubishi Int'l. Corp., New York, N.Y. The carrier top portion (104) which is approximately 19 inches long by about 35 inches wide is joined to the floor portion (106) which measures approximately 19 inches long by 10 inches wide, and to the closed end (112) by stitching. Preferably, all interior seams in the carrier (100) are finished by binding with a plastic binding fabric (144). Decorative trim cording (146) of the same fabric or another fabric may be added to the outside seams joining the carrier top portion and floor portion to the closed end. Likewise, cording (146) may be incorporated into the seam incorporating the fastening means into the reclosable end.

The handles (128) are made of a woven material of nylon webbing or strap material fabric which is available from Mitsubishi Int'l. Corp., New York, N.Y. Each of the handles (128) is approximately 49 inches long by 1¼ inches wide by 1/16 inches thick. The handles are preferably sewn into the seams (142) joining the floor portion (106) to the top portion (102) and are also sewn to each of the side walls (108). Approximately 24 inches of the handle (128) is not sewn.

Typically the dimensions of the bag are about 19 inches long by approximately 13 inches high from floor portion to roof and about 14 inches in diameter from side wall to side wall. The C-shaped perforate panel (118) on the reclosable end (113) is made of a 100% polyester or nylon mesh material manufactured by Mitsubishi Int'l. Corp. of New York, N.Y. The mesh is preferably a hexagonally shaped pattern. The perforate panel dimensions are preferably about 7 inches across at the ends of the "C," about 9 inches from top of the "C"

to the bottom of the "C" and about 9½ inches across the widest point. The openable end (113) is preferably fastened by a zipper fastener (123). One of the tapes (125) of zipper (123) is sewn to the edges (148) of the openable end (113) which are not joined to the floor portion and the other tape (125) of zipper (123) is sewn to the edges of the top portion (104) of the carrier (100). The zipper (123) can be fastened in a conventional manner by pulling one or both of the tabs (126) toward the other.

Typically, the feet (135) on the exterior surface (116) of the floor (106) are made of plastic materials and are typically about ⅜ inch high by about ½ inch wide at the frustrum. The feet (135) have a cylindrical portion with an outwardly and downwardly extending frustoconical portion. The apex of the frustrum is slightly dimpled inwardly toward the cylindrical portion. The feet (135) are available from Mitsubishi Int'l. Corp. of New York, N.Y. They are fastened to the floor (106) at the top of the cylindrical portion and penetrate the floor portion and are secured to the interior surface (114) of the carrier (100).

The safety strap (130) is preferably made of the same material strapping as the side handles (128). The safety strap (130) preferably lies centered on the exterior surface (116) of the roof (107). The strap (130) is sewn to the roof (107) at each of the ends (133) of the safety strap (130). The dimensions of the safety strap are preferably about 10½ inches long by about 1¼ inches wide. The nonfastened middle portion (134) is approximately 8 inches long.

In yet another embodiment, the invention provides a cat transportation kit that includes a furniture device for a cat (20) as previously described and a carrier (100) as previously described.

Yet another embodiment of the invention provides for the cat carrier (100) of this invention for use in combination with the cat furniture device (20) as previously described.

It is to be understood that the means for pendently mounting the cat toy (90) may be a rigidly hinged member or a chain wire or the cable or the like. Further, the mouse toy may also be suitably formed of a cylinder of suede filled with Dacron fiber or catnip, the end of the cylinder having annular bands of fur-like material.

Housings of various sizes and configurations may be employed with the cat furniture device of this invention. It should also be understood that the housing may be fabricated of various materials, including plastic, wood, fiberboard, or the like. It should also be understood that the carrier may be fabricated of varied materials including canvas, wool, or the like.

In addition, the planar floor portion of the device (20) may be molded along with the side wall and roof portions, forming a unitary housing.

It should also be contemplated that the fastener (122) may be fabricated out of snappers, grippers or velcro or the like, rather than a zipper fastening means. It should be understood that rubberized materials includes and is not limited to natural materials, but includes plastics which are tacky enough to attract loose cat fur. It should also be understood that the protuberances may be projections of varying geometrical shapes including polygons, irregular curvilinear surfaces, and surfaces of the protuberances may be concave, flat or convex inclinations, or the like.

It should also be understood that wherein specific materials are described for performing the functions of covering the exterior, removing cat hair and serving as a scratching or claw exercising second material, other similar materials may be used. It should also be understood that wherein glue is described as the means of bonding, the materials may be attached by double-sided adhesive tape, hot melt tape, staples or velcro, and could further be integral with the materials from which the housing is constructed. It is understood that the invention is not confined to the particular construction and arrangement of parts herein illustrated and described, but embraces such modified forms thereof as come within the scope of the following claims.

It should also be understood that wherein the materials are described as sewn, other similar means of joining or affixing may be used such as gluing or bonding or the like.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

I claim:

1. A furniture device for a cat comprising:
a) a rigid housing having a top portion having a pair of imperforate sidewalls and an adjoining planar floor portion affixed therebetween said sidewalls, said housing having at least one open end, an interior surface and an exterior surface, said interior surface comprising a top portion interior surface and a floor portion interior surface, said housing further defining a device interior cavity; and
b) a first material affixed to said housing and disposed within said interior cavity and generally conforming to said top portion interior surface of said housing, said first material having a plurality of rubberized protuberances thereupon, said protuberances extending into said interior cavity.

2. A furniture device for a cat comprising:
a) a rigid housing having a top portion and an adjoining floor portion, said housing having at least one open end, an interior surface and an exterior surface, said interior surface comprising a top portion interior surface and a floor portion interior surface, said housing further defining a device interior cavity;
b) first material affixed to said housing and disposed within said interior cavity and generally conforming to said top portion interior surface of said housing said first material having a plurality of rubberized protuberances thereupon, said protuberances extending into said interior cavity; and
c) a second material affixed to said first material and disposed within said interior cavity, and generally co-extensive with said floor portion, said second material having a plurality of compressible ribs.

3. The furniture device of claim 2, wherein said ribs are parallel with said open end.

4. The furniture device of claim 2, wherein said second material further comprises a planar rib spacing between a pair of said ribs.

5. The furniture device of claim 4, wherein each said rib comprises a rib height and wherein rib spacing is approximately equal to said rib height.

6. The furniture device of claim 2, further comprising a layer of cushioning material disposed between said top portion and said first material and generally co-extensive with said top portion.

7. The furniture device of claim 2, wherein said housing has two open opposite ends.

8. The furniture device of claim 2, wherein said top portion of said housing has a generally C-shaped cross-section, said top portion of said housing comprising a partial section of a right circular cylinder which is cut parallel to the longitudinal axis of said cylinder, said floor portion being planar and having a length corresponding to the length of said cylinder and having a width corresponding to the chord distance of the partial section of the cylinder.

9. A furniture device for a cat comprising:
a) a rigid housing having a top portion and a floor portion affixed to said top portion, said housing having at least one open end and defining an interior surface, an exterior surface, and an interior cavity, said interior surface comprising a top portion interior surface and a floor portion interior surface;
b) a first material affixed to said housing and disposed within said interior cavity and generally conforming to said top portion interior surface of said housing, said first material having an exterior surface directed toward said interior cavity, said exterior surface adapted to attract and hold loose pet hair from a cat;
c) a second material affixed to said first material and disposed within said interior cavity, and generally co-extensive with said floor portion, said second material having a plurality of compressible ribs with a planar rib spacing between a pair of said ribs;
d) a layer of cushioning material disposed between said top portion and said first material and generally co-extensive with said top portion.

10. The furniture device of claim 9, wherein said housing has two open opposite ends.

11. The furniture device of claim 9, wherein said housing has a generally C-shaped cross-section, with said top portion of said housing comprising a partial section of a cylinder which is cut parallel to the length axis of said cylinder, said floor being planar and having a length corresponding to said length axis of said cylinder and having a width corresponding to the chord distance of the partial section of the cylinder.

12. The furniture device of claim 9, wherein said ribs are parallel with said open end.

13. The furniture device of claim 9, wherein said exterior surface of said first material further comprises a plurality of rubberized protuberances thereupon, said protuberances extending into said interior cavity.

14. A furniture device for cats comprising:
a) a rigid housing having a top portion and a floor portion affixed to said top portion, said housing having at least one open end and defining an interior surface, an exterior surface and a device interior cavity, said interior surface comprising a top portion interior surface and a floor portion interior surface; said housing further having a generally C-shaped cross-section; said top portion of said housing comprising a partial section of a cylinder which is cut parallel to the length axis of said cylinder, said floor portion being planar and having a length corresponding to said length axis of said cylinder and having a width corresponding to the chord distance of the partial section of the cylinder;
b) a first material affixed to said housing and disposed within said interior cavity and generally conforming to said top portion interior surface of said housing, said first material having a plurality of rubberized protuberances thereupon, said protuberances disposed toward said interior cavity; and
c) a second material affixed to said first material and disposed within said interior cavity, and generally co-extensive with said floor portion, said second layer having a plurality of compressible ribs, said ribs parallel with one of said open ends and directed toward said interior cavity.

15. The furniture device of claim 14, wherein said device can support at least 100 pounds of weight upon said top portion.

16. A carrier for enclosing and transporting in a vehicle having a safety belt a furniture device for cats, said carrier comprising:
a) a flexible carrier housing having a carrier top portion and a carrier floor portion joined to said carrier top portion, said carrier housing having a closed end joined to said carrier top portion and said carrier floor portion and a reclosable end joined to said carrier floor portion, and defining an interior carrier surface and an exterior carrier surface, said interior carrier surface dimensioned to accept said furniture device for cats;
b) a perforate panel penetrating one of said carrier ends,
c) a safety strap centrally positioned on said carrier top portion exterior carrier surface and fixedly attached to said carrier top portion, and
d) a fastener affixed both to said carrier housing and to said reclosable end for fastening said reclosable end to a fastened state,
wherein said furniture device for cats comprises
i) a rigid housing having a housing top portion and an adjoining housing floor portion, said housing having at least one housing open end, an interior housing surface and an exterior housing surface, said interior housing surface comprising a housing top portion interior surface and a housing floor portion interior surface, said housing further defining a device interior cavity; and
ii) a liner affixed to said housing and disposed within said interior cavity and generally conforming to said interior housing surface, said liner comprising a first material having a plurality of rubberized protuberances thereupon, said protuberances extending into said device interior cavity.

17. The carrier of claim 16, wherein said safety strap comprises two opposing strap ends and a middle portion therebetween, said safety strap centrally positioned on said carrier top portion exterior surface and fastened to said carrier top portion at each said opposing strap end.

18. The carrier of claim 16, wherein said perforate panel is located on said reclosable end.

19. The carrier of claim 16, further comprising a pair of handles affixed to said top portion and opposite one another.

20. The carrier of claim 16, further comprising two sets of feet on said exterior floor of said carrier, said pairs of feet parallel to and spaced from each other.

21. A carrier for cats for use in combination with a furniture device for cats, said carrier for enclosing and transporting said furniture device for cats in a vehicle having a safety belt, said carrier comprising:
  a) a flexible carrier housing having a C-shaped partially cylindrical carrier top portion and a planar generally rectangular carrier floor portion affixed to said carrier top portion, said carrier housing having a carrier closed end and an opposite carrier reclosable end, said carrier closed end fixedly attached to said carrier top portion and to said carrier floor portion, said carrier reclosable end fixedly attached to said carrier floor portion and releasably attached to said carrier top portion, defining an interior carrier surface and an exterior carrier surface, said interior carrier surface dimensioned and configured to accept said furniture device for cats,
  b) a perforate panel penetrating said carrier reclosable end,
  c) a safety strap centrally positioned on said exterior surface of said carrier top portion,
  d) a fastener for fastening said carrier reclosable end to said carrier top portion for a fastened state;
  e) a pair of handles affixed to said carrier top portion and opposite one another;
wherein said furniture device for cats comprises:
  i) a rigid housing having a housing top portion and a housing floor portion affixed to said housing top portion, said housing having at least one housing open end and defining an interior housing surface and an housing exterior surface, said housing interior surface comprising a housing top portion interior surface and a housing floor portion interior surface; said housing defining a device interior cavity; said housing further having a generally C-shaped cross-section, with said top portion of said housing comprising a partial section of a cylinder which is cut parallel to the length axis of said cylinder, said housing floor being planar and having a length dimension corresponding to said length axis of said cylinder and having a width dimension corresponding to the chord distance of the partial section of the cylinder;
  ii) a first material affixed to said housing and disposed within said interior cavity and generally conforming to said housing top portion interior surface, said first material having a plurality of rubberized protuberances thereupon, said protuberances disposed toward said interior cavity; and
  iii) a second material affixed to said first material and disposed within said interior cavity, and generally co-extensive with said housing floor portion, said second layer having a plurality of compressible ribs, said ribs parallel with said open end and directed toward said interior cavity;
wherein said carrier reclosable end is unfastened along said carrier top portion, said furniture device is inserted into said carrier, a cat is placed into said furniture device, said carrier reclosable end is fastened to a closed state, said carrier is placed on a seat of a vehicle, a safety belt is threaded through said safety strap and said safety belt is fastened.

22. A cat transportation kit comprising:
  a) a furniture device for a cat comprising:
    i) a rigid housing having a top portion and a floor portion affixed to said top portion, said housing having at least one open end and defining an interior surface and an exterior surface, said interior surface comprising a housing top portion interior surface and a housing floor portion interior surface, said housing further defining a device interior cavity;
    ii) a first material affixed to said housing and disposed within said interior cavity and conforming to said housing top portion interior surface, said first material having a plurality of rubberized protuberances thereupon, said protuberances extending into said interior cavity; and
  b) a flexible carrier for enclosing and transporting said furniture device for a cat in a vehicle having a safety belt, said carrier comprising:
    i) a carrier housing having a carrier top portion and a carrier floor portion affixed to said top portion, said housing having a closed end and a reclosable end, said carrier housing defining an interior surface and an exterior surface, said interior carrier surface dimensioned to accept said furniture device for cats;
    ii) a perforate panel penetrating at least one of said carrier housing ends,
    iii) a safety strap centrally positioned on said carrier top portion, and
    iv) a fastener for fastening said reclosable end to said carrier housing.

23. The cat transportation kit of claim 22 further comprising a second material affixed to said first material and disposed within said interior cavity, and generally co-extensive with said floor portion, said second material having a plurality of compressible ribs, directed toward said interior cavity.

24. The cat transportation kit of claim 23 wherein said ribs are parallel with said open end.

* * * * *